US012749840B2

(12) United States Patent
Little et al.

(10) Patent No.: US 12,749,840 B2
(45) Date of Patent: Sep. 29, 2026

(54) CONTACT ASSEMBLY AND METHOD OF MAKING SAME AND ELECTRICAL CONNECTOR INCLUDING THE CONTACT ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Terrance F. Little, Fullerton, CA (US); Patrick R. Casher, North Aurora, IL (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 412 days.

(21) Appl. No.: 18/477,035

(22) Filed: Sep. 28, 2023

(65) Prior Publication Data

US 2024/0113465 A1 Apr. 4, 2024

Related U.S. Application Data

(60) Provisional application No. 63/377,856, filed on Sep. 30, 2022.

(51) Int. Cl.

| | |
|---|---|
| ***H01R 13/40*** | (2006.01) |
| ***H01R 13/405*** | (2006.01) |
| ***H01R 13/516*** | (2006.01) |
| ***H01R 13/6471*** | (2011.01) |
| ***H01R 43/24*** | (2006.01) |

(52) U.S. Cl.

CPC ......... *H01R 13/405* (2013.01); *H01R 13/516* (2013.01); *H01R 13/6471* (2013.01); *H01R 43/24* (2013.01); *H01R 2201/06* (2013.01)

(58) Field of Classification Search

CPC ................ H01R 13/405; H01R 13/516; H01R 13/6471; H01R 43/24; H01R 2201/06; H01R 13/6589; H01R 13/02; H01R 13/40; H01R 43/16

See application file for complete search history.

(56) References Cited

U.S. PATENT DOCUMENTS

| | | | | |
|---|---|---|---|---|
| 8,177,564 | B1 * | 5/2012 | Ito ...................... | H01R 13/6471 439/108 |
| 8,764,460 | B2 | 7/2014 | Smink et al. | |
| 8,764,464 | B2 | 7/2014 | Buck et al. | |
| 9,455,530 | B2 | 9/2016 | Patel | |

(Continued)

FOREIGN PATENT DOCUMENTS

| | | |
|---|---|---|
| CN | 204760581 U | 11/2015 |
| CN | 105490094 A | 4/2016 |

*Primary Examiner* — Truc T Nguyen

(74) *Attorney, Agent, or Firm* — Ming Chieh Chang

(57) ABSTRACT

A contact assembly for an electrical connector includes: a signal contact module including a first insulator and plural pairs of signal contacts insert-molded with the first insulator; a ground contact module including a second insulator and plural ground contacts insert-molded with the second insulator; and a conductive plastic member molded with the plural ground contacts, wherein the first insulator is assembled to the second insulator.

5 Claims, 8 Drawing Sheets

(56) References Cited

U.S. PATENT DOCUMENTS

| | | | | |
|---|---|---|---|---|
| 9,692,183 | B2 | 6/2017 | Phillips et al. | |
| 9,768,557 | B2 | 9/2017 | Phillips et al. | |
| 10,367,308 | B2 * | 7/2019 | Little | H01R 4/2404 |
| 10,396,513 | B2 | 8/2019 | Regnier | |
| 10,644,455 | B1 * | 5/2020 | Champion | H01R 13/6599 |
| 11,322,869 | B2 | 5/2022 | Phillips et al. | |
| 2014/0127946 | A1 | 5/2014 | Ito et al. | |
| 2017/0170606 | A1 * | 6/2017 | Phillips | H01R 13/6471 |
| 2019/0067876 | A1 * | 2/2019 | Tang | H01R 13/6587 |
| 2021/0075164 | A1 * | 3/2021 | Chen | H01R 13/2464 |
| 2021/0194180 | A1 * | 6/2021 | Wang | H01R 12/724 |
| 2021/0320460 | A1 * | 10/2021 | Huang | H01R 13/6599 |
| 2021/0328384 | A1 | 10/2021 | Avery et al. | |
| 2021/0336360 | A1 | 10/2021 | Kolak et al. | |
| 2022/0021158 | A1 | 1/2022 | Little et al. | |
| 2022/0115818 | A1 * | 4/2022 | Little | H01R 25/00 |
| 2022/0216635 | A1 | 7/2022 | Little et al. | |
| 2022/0352675 | A1 | 11/2022 | Zerebilov et al. | |
| 2023/0139926 | A1 * | 5/2023 | Little | H01R 13/6471<br>439/626 |

* cited by examiner

CONTACT ASSEMBLY AND METHOD OF MAKING SAME AND ELECTRICAL CONNECTOR INCLUDING THE CONTACT ASSEMBLY

CROSS REFERENCE TO RELATED APPLICATION

This application claims priority to and benefit of U.S. Provisional Patent Application No. 63/377,856, filed Sep. 30, 2022.

BACKGROUND OF THE INVENTION

Field of the Invention

The present invention relates to a contact assembly for an electrical connector, a method of making the contact assembly, and an electrical connector including the contact assembly. The contact assembly comprises a signal contact module including a first insulator and plural pairs of signal contacts insert-molded with the first insulator, a ground contact module including a second insulator and a plurality of ground contacts insert-molded with the second insulator, and a conductive plastic member molded with the plurality of ground contacts.

Description of Related Arts

U.S. Pat. No. 9,768,557 discloses an electrical connector in which, during manufacture, signal and ground contacts may be stamped and formed contacts defining leadframes. The leadframes arrange the contacts in an array, and carrier strips of the leadframe may be removed after stamping and forming to define a contact array. The leadframes are overmolded to form overmold bodies. Optionally, the leadframes may be overmolded in a multi-stage molding process where main bodies are molded in a first stage and lossy ground absorbers (e.g., conductive plastic members) are molded in a second stage, or vice versa. The lossy ground absorbers may be co-molded with the main bodies in a multi-shot molding process, such as a two-shot molding process, where the main bodies and the lossy ground absorbers are molded from different materials, such as a low loss plastic material and a lossy material, respectively.

SUMMARY OF THE INVENTION

A contact assembly for an electrical connector comprises: a signal contact module including a first insulator and plural pairs of signal contacts insert-molded with the first insulator; a ground contact module including a second insulator and a plurality of ground contacts insert-molded with the second insulator; and a conductive plastic member molded with the plurality of ground contacts, wherein the first insulator is assembled to the second insulator.

A method of making a contact assembly comprises the steps of: molding a first insulator with plural pairs of signal contacts to form a signal contact module; molding a second insulator with plurality of ground contacts to form a ground contact module; assembling the first insulator to the second insulator; and molding a conductive plastic member to connect the plurality of ground contacts.

An electrical connector comprises an insulative housing and a contact assembly received in the insulative housing, the contact assembly including: a signal contact module including a first insulator and plural pairs of signal contacts insert-molded with the first insulator; a ground contact module including a second insulator and a plurality of ground contacts insert-molded with the second insulator; and a conductive plastic member molded with the plurality of ground contacts, wherein the first insulator is assembled to the second insulator.

DETAILED DESCRIPTION OF THE PREFERRED EMBODIMENT

Figure 1:
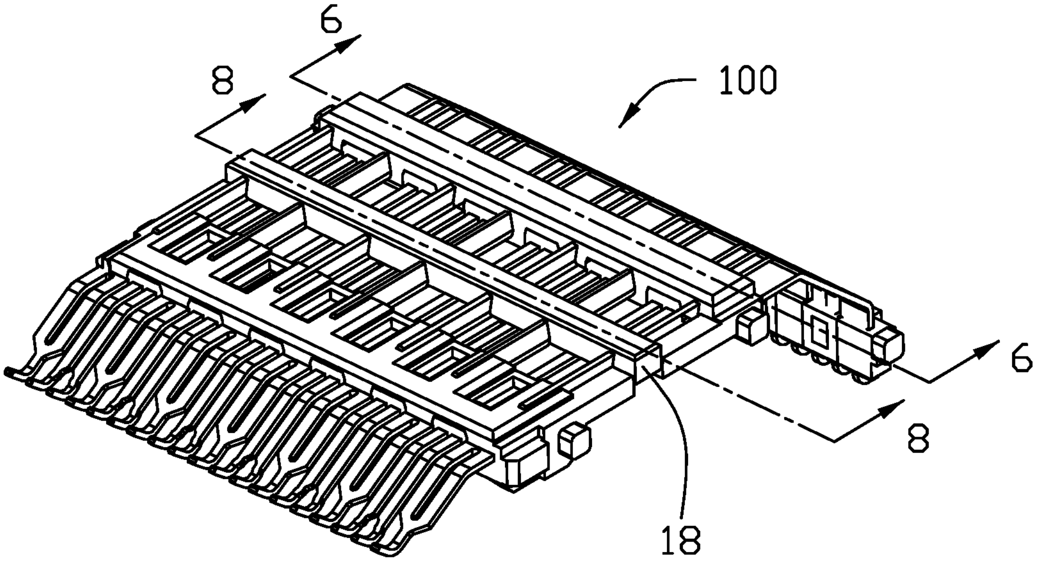
FIG. 1 is a perspective view of a contact assembly in accordance with the present invention.
Figure 2:
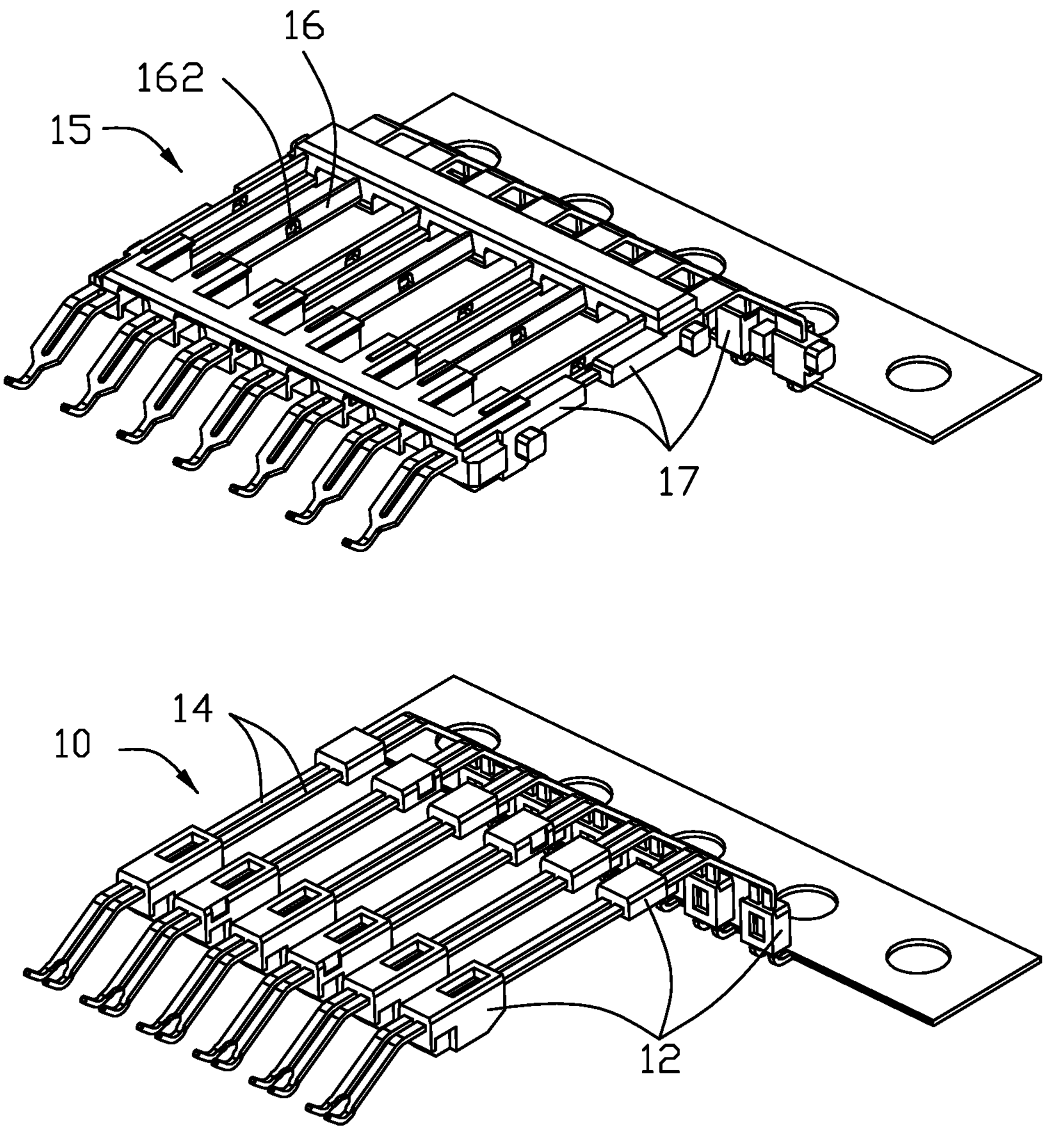
FIG. 2 is an exploded view of the contact assembly showing a signal contact module and a ground contact module thereof connected with respective carrier strips.
Figure 3:
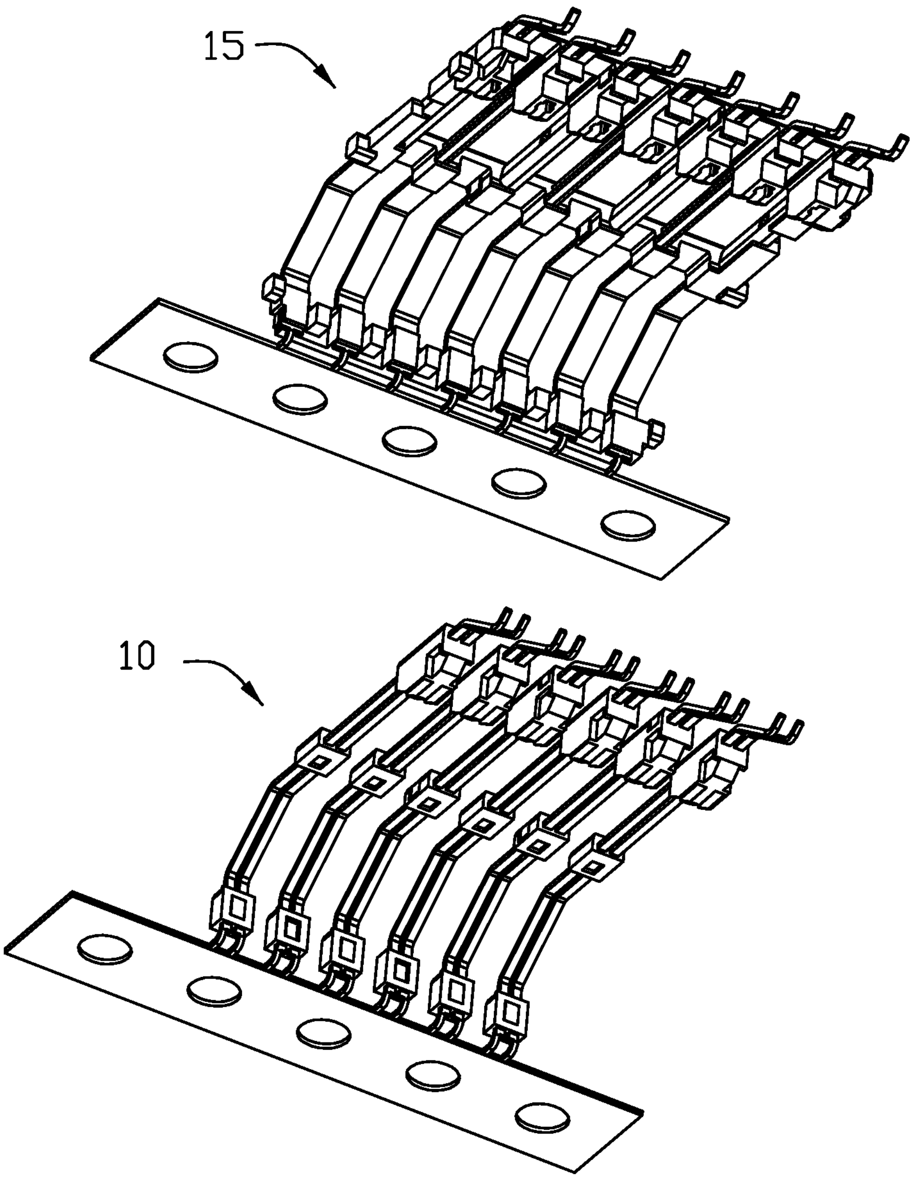
FIG. 3 is a view similar to FIG. 2 but from another perspective.

Referring to FIGS. 1-8, a contact assembly 100 for an electrical connector comprises: a signal contact module 10 including an insulator 12 and plural pairs of signal contacts 14 insert-molded with the insulator 12, the plural pairs of signal contacts 14 being arranged in the transverse direction; a ground contact module 15 also including a plurality of ground contacts 16 insert-molded with an insulator 17, the plurality of ground contacts 16 each disposed beside a corresponding pair of signal contacts 14; and an electrically lossy molded with the plurality of ground contacts 16 in order to mechanically and electrically connect the ground contacts 16 together. The electrically lossy member may be a conductive plastic member 18 made of conductive. plastic. The electrical connector to which the contact assembly 100 may be applied is generally of a known design and may be an electrical receptacle mounted onto a host board and include an insulative housing receiving one or more such contact assemblies, such as a receptacle connector disclosed in U.S. Pat. No. 10,367,308, or it may be a plug connector or a receptacle connector connected to a cable.

The signal contact module 10 exhibits a signal contact lead-frame with discrete molded insulating features. The insulator 12 of the signal contact module 10 includes plural discrete portions each receiving a corresponding pair of signal contacts 14. Specifically, in this embodiment, three discrete portions are formed on each pair of the signal contacts and are arranged along the length of the signal contacts. The ground contact module 15 also exhibits a ground contact lead-frame with discrete molded insulating features. Specifically, the insulator 17 of the ground contact module 15 is divided into two discrete parts. The two part are arranged along the length of the ground contacts. Each of the part extends in the transverse direction, and fixes the ground contacts 16 together. The ground contact lead-frame is stamped and formed to have flow-thru holes 162 for conductive plastic to flow through in a second shot molding process. The conductive plastic passes through the flow-thru holes 162 and joins the ground contacts 16 to reduce crosstalk resonance peaks and facilitate the transmission of high-speed signals. In the present invention, the signal contacts 14 and the ground contacts 16 are respectively formed by stamping different metal sheets. Before molding, the signal contacts 14 are connected to a carrier strip, and the ground contacts 16 are connected to another carrier strip.

Each of the plurality of ground contacts 16 includes an intermediate portion 164 having a horizontal body 165 and a substantially vertical shield 166, a front contacting portion 168, and a rear tail 169. In the embodiment shown, the shield 166 angularly extends from the horizontal body 165 to form an acute angle therebetween. The shields 166 act as ground shields between signal contacts to reduce crosstalk and may further improve impedance control.

Figure 4:
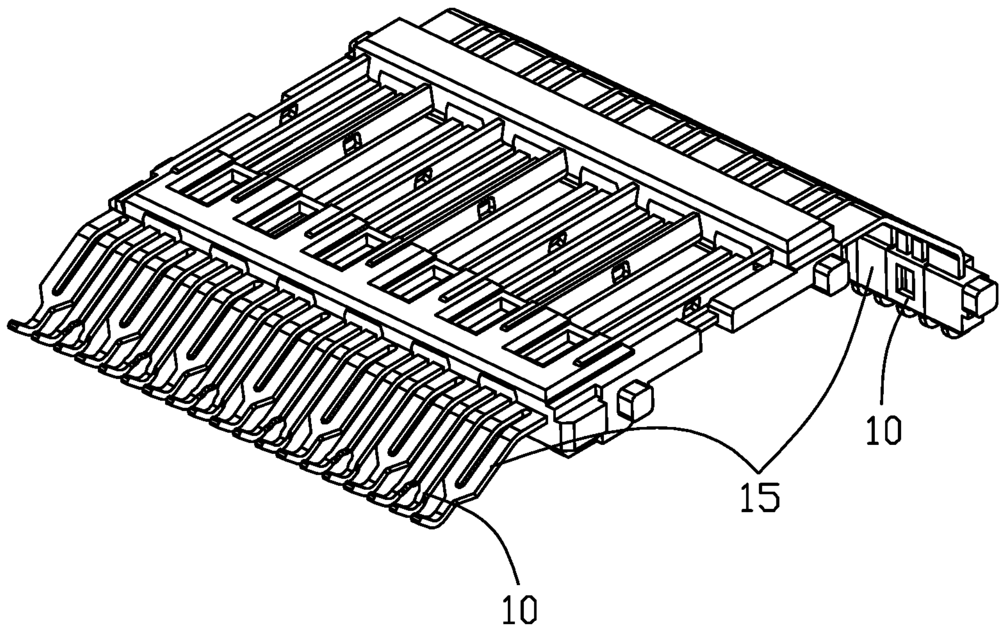
FIG. 4 is an assembled view of the signal contact module and the ground contact module.
Figure 5:
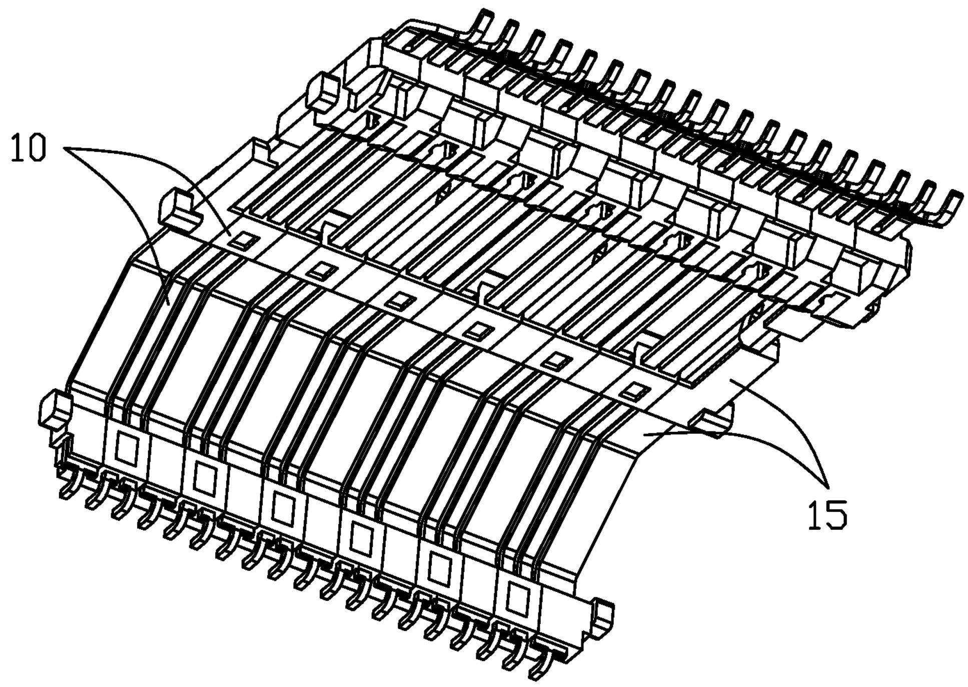
FIG. 5 is a view similar to FIG. 4 but from another perspective.
Figure 6:
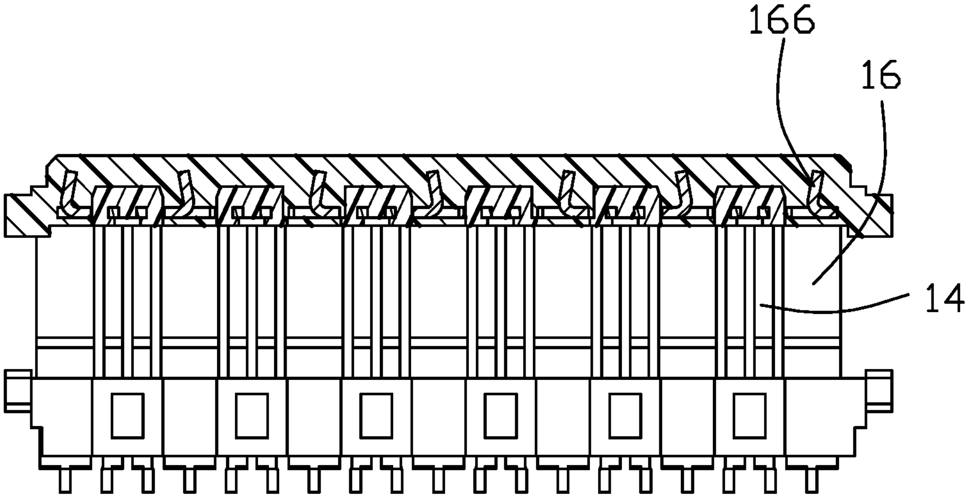
FIG. 6 is a cross-sectional view of the contact assembly taken along line 6-6 in FIG. 1.
Figure 7:
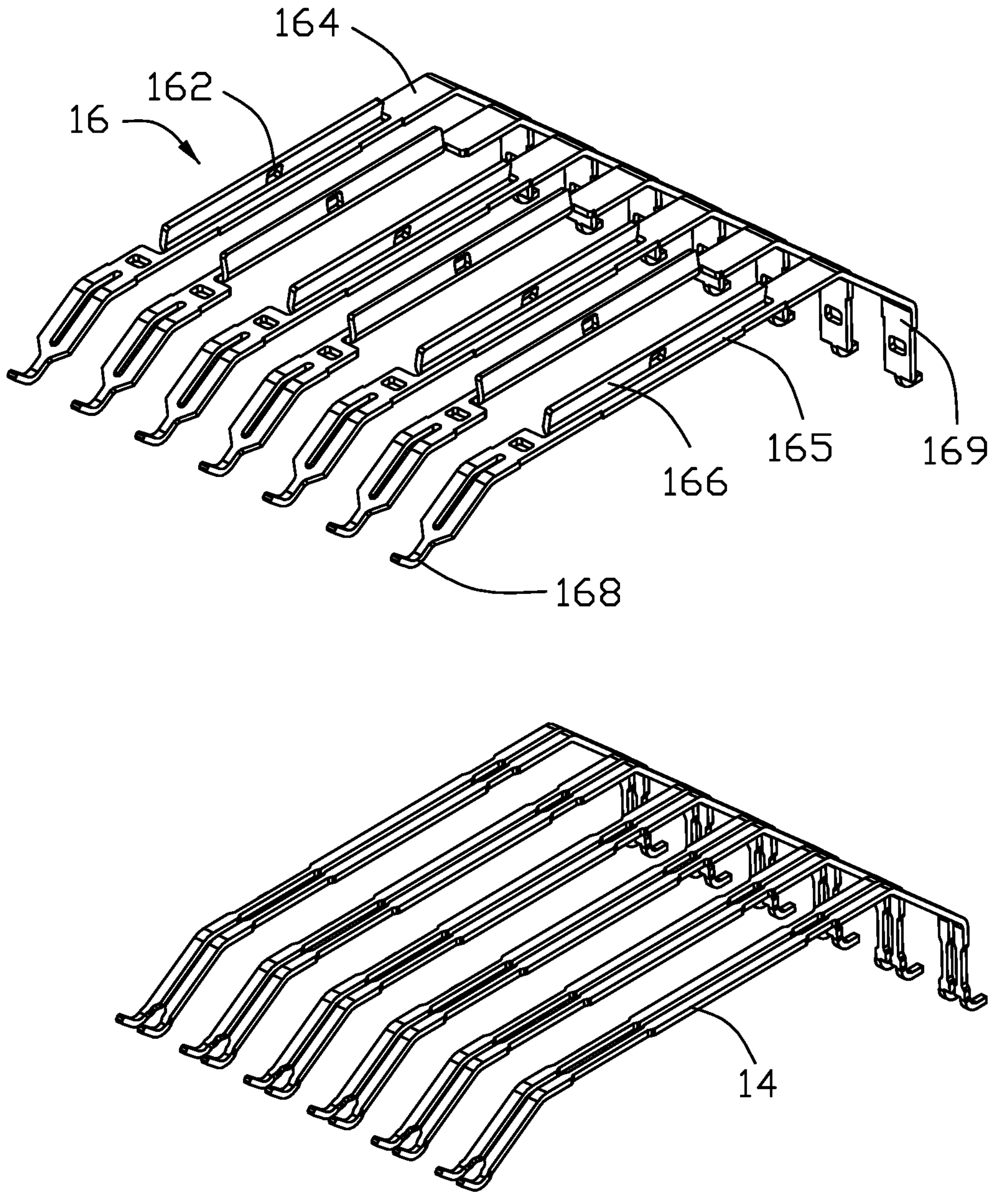
FIG. 7 is a perspective view showing only respective plurality of contacts of the signal contact module and the ground contact module in FIG. 2.
Figure 8:
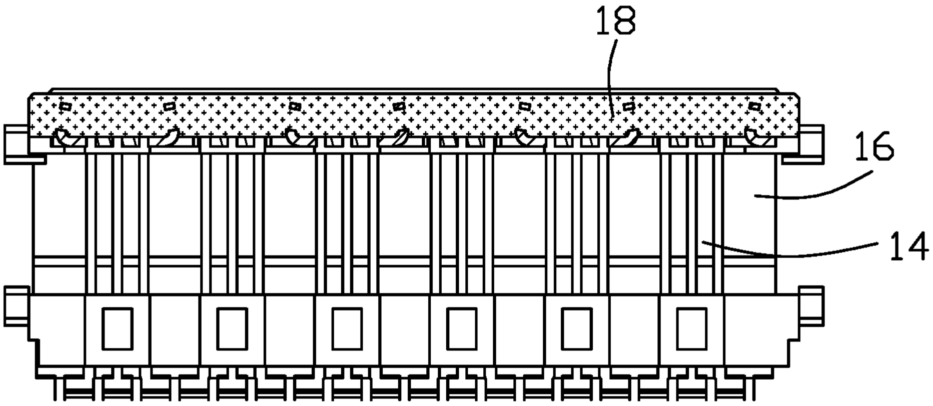
FIG. 8 is a cross-sectional view of the contact assembly taken along line 8-8 in FIG. 1.

The flow-thru hole 162 is disposed on the shield 166 of the intermediate portion 164 of each ground contact 16 and the conductive plastic member 18 is molded with the shields 166 and fills up the holes 162 of the ground contacts 16. Before molding the conductive plastic member 18, the signal contact module 10 and the ground contact module 15 are assembled together as shown in FIG. 4. Second shot conductive plastic passes through the ground contact lead-frame flow-thru holes 162 and joins only the ground contacts 16. The conductive plastic member 18 is shown as a one-piece component molded to embed a portion of each ground contact 16. The conductive plastic member 18 extends along the transverse direction Preferably, the conductive plastic member 18 is molded at a location separate from the insulator 12 of the signal contact module 10 and the insulator 17 of the ground contact module 15. That is, the conductive plastic is neither formed on the insulator 12 of the signal terminal module 10 nor formed on the insulator 17 of the ground terminal module 15. In other embodiments, the conductive plastic is molded to the ground contacts before the signal contact module 10 and the ground contact module 15 are assembled together.

The invention claimed is:

1. A contact assembly for an electrical connector, comprising:

a signal contact module including a first insulator and plural pairs of signal contacts insert-molded with the first insulator;

a ground contact module including a second insulator and a plurality of ground contacts insert-molded with the second insulator; and a conductive plastic member molded with the plurality of ground contacts; wherein the first insulator is assembled to the second insulator; and each of the plurality of ground contacts includes a front contacting portion, a rear tail and an intermediate portion having a horizontal body and a substantially vertical shield therebetween, and the conductive plastic member is molded with the substantially vertical shields.

2. The contact assembly as claimed in claim 1, wherein the shield of the intermediate portion of each ground contact has a hole and the conductive plastic member fills up the holes of the ground contacts.

3. The contact assembly as claimed in claim 1, wherein the horizontal body and the shield of the intermediate portion forms an acute angle therebetween.

4. The contact assembly as claimed in claim 1, wherein the conductive plastic member is located separated from the first insulator of the signal contact module and the second insulator of the ground contact module.

5. The contact assembly as claimed in claim 1, wherein the conductive plastic member is a one-piece component extending in a transverse direction.

* * * * *